(12) United States Patent
Healey et al.

(10) Patent No.: US 8,085,837 B2
(45) Date of Patent: Dec. 27, 2011

(54) CHARACTERIZING NON-COMPENSABLE JITTER IN AN ELECTRONIC SIGNAL

(75) Inventors: Adam B. Healey, Newburyport, MA (US); Mark J. Marlett, Livermore, CA (US)

(73) Assignee: Agere Systems Inc., Allentown, PA (US)

( * ) Notice: Subject to any disclaimer, the term of this patent is extended or adjusted under 35 U.S.C. 154(b) by 767 days.

(21) Appl. No.: 12/141,436

(22) Filed: Jun. 18, 2008

(65) Prior Publication Data

US 2008/0317109 A1 Dec. 25, 2008

Related U.S. Application Data

(60) Provisional application No. 60/936,197, filed on Jun. 19, 2007.

(51) Int. Cl.
*H04B 3/46* (2006.01)
*H04B 17/00* (2006.01)
*H04Q 1/20* (2006.01)

(52) U.S. Cl. ......................... 375/226; 375/224

(58) Field of Classification Search .................... 375/226
See application file for complete search history.

(56) References Cited

U.S. PATENT DOCUMENTS

| | | | | |
|---|---|---|---|---|
| 6,597,746 B1 * | 7/2003 | Amrany et al. | ................ | 375/296 |
| 7,242,712 B1 * | 7/2007 | Katic | ............................ | 375/233 |
| 2001/0031020 A1 * | 10/2001 | Hwang et al. | ................. | 375/316 |
| 2002/0176491 A1 * | 11/2002 | Kleck et al. | .................... | 375/226 |
| 2005/0013310 A1 * | 1/2005 | Banker et al. | ................. | 370/401 |
| 2005/0152488 A1 * | 7/2005 | Buckwalter et al. | .......... | 375/350 |
| 2008/0111633 A1 * | 5/2008 | Cranford et al. | ................ | 331/10 |
| 2008/0192814 A1 * | 8/2008 | Hafed et al. | .................. | 375/224 |

* cited by examiner

*Primary Examiner* — David C. Payne
*Assistant Examiner* — Erin File
(74) *Attorney, Agent, or Firm* — Mendelsohn, Drucker & Associates, P.C.; Steve Mendelsohn

(57) ABSTRACT

One embodiment of the present invention processes a signal of interest through an optional reference channel, combines the resulting signal with white noise, and then processes the noisy signal through a reference receiver. Two metrics are calculated from the results of that processing: Non-Compensable Data-Dependent Jitter (NC-DDJ) and Enhanced Transmitter and Waveform Dispersion Penalty (Enhanced TWDP). Within the reference receiver, a variable delay module sweeps the eye opening defined by the noise-free samples of the signal of interest and determines the transition points (i.e., edges) of the eye opening. Those transition points are compared to the Unit Interval to yield NC-DDJ. Further, the signal-to-noise ratio (SNR) of the noisy samples of the signal of interest is compared to the SNR of an ideal receiver (i.e., matched filter) driven by an ideal transmitter via an ideal channel with additive white Gaussian noise n(t) to yield Enhanced TWDP.

22 Claims, 12 Drawing Sheets

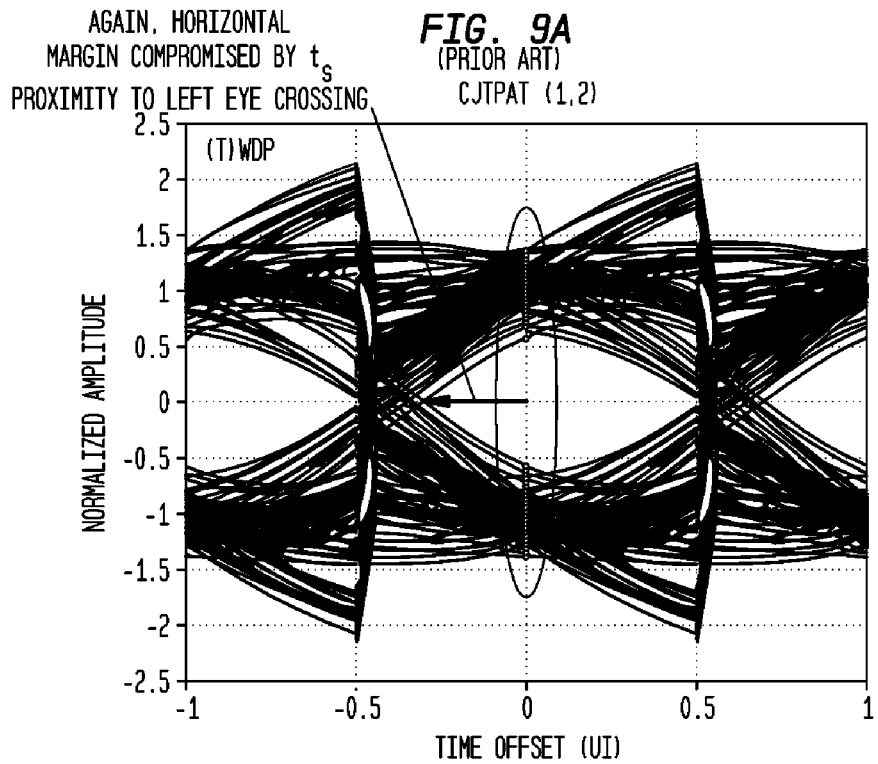
FIG. 9A (PRIOR ART) CJTPAT (1,2)
AGAIN, HORIZONTAL MARGIN COMPROMISED BY $t_s$ PROXIMITY TO LEFT EYE CROSSING
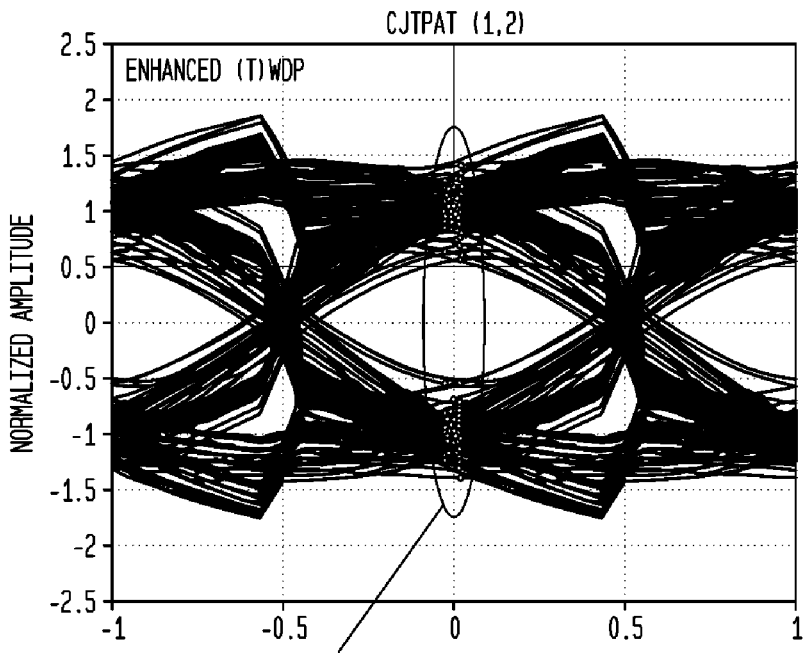
FIG. 9B CJTPAT (1,2)
TRU MODEL IS ALSO CAPABLE FOR ACCOUNTING FOR DATA DEPENDENT PHASE ERROR

CHARACTERIZING NON-COMPENSABLE JITTER IN AN ELECTRONIC SIGNAL

CROSS-REFERENCE TO RELATED APPLICATIONS

This application claims the benefit of the filing date of U.S. provisional application No. 60/936,197, filed on Jun. 19, 2007 as attorney docket no. Healey 5-3, the teachings of which are incorporated herein by reference.

BACKGROUND OF THE INVENTION

1. Field of the Invention

The present invention relates to communications, such as the communications between components on a circuit board or between a fiber optic transmitter and receiver.

2. Description of the Related Art

FIG. 1 is a high-level block diagram of a serial communications system 100 comprising a transmitter 102, a receiver 110, and a channel 106, which carries signals from transmitter 102 to receiver 110. The transmitter takes as its input a stream of binary ones and zeroes and encodes that bitstream as a signal appropriate to the medium, e.g., a stream of changing voltages on a circuit board or varying pulses of light over a fiber optic cable. Typically, this encoding is done at a steady rate determined by the transmitter's clock frequency, so that each encoded bit occupies an equal amount of time known as the Unit Interval (UI).

There are many such encoding methods, divided into two main families: synchronous and asynchronous. In synchronous encoding, the transmitter's clock signal is sent to the receiver on a channel separate from the data. In contrast, asynchronous encoding does away with a separate channel and embeds the clock signal in the data stream itself.

Asynchronous encoding can be divided further into two groups: Return-to-Zero (RZ) and Non-Return-to-Zero (NRZ). RZ encoding uses two values to represent the binary data and a third or "zero" value to represent the boundaries between symbols. Like synchronous coding, RZ encoding provides a steady stream of value transitions to represent clock signals, but does so at a high cost: half the bandwidth is consumed by these non-data zero values.

NRZ encoding recovers this bandwidth by doing away with the zero values and encoding the data with only two values. The tradeoff is that an NRZ receiver cannot rely on a metronomic sequence of value transitions to serve as an unambiguous clock signal. For example, in an NRZ signal, a sequence of repeating zeroes may be represented by an equally long period without transitions. Thus, an NRZ receiver typically uses the transitions that are present to synchronize its own internal clock and uses that internal clock to make educated guesses as to where to sample when no transition is present. The receiver module that extracts the clock signal from an NRZ signal is known as a timing recovery unit (TRU) and is typically implemented using a phase locked loop (PLL).

For all these methods, the decoding of a signal is made more difficult by the distortion added by various components in the system. Of particular concern here is a specific distortion called "jitter," defined as short-term variations of a digital signal's transitions from their ideal positions in time. In other words, jitter is phase distortion, e.g., a transition event arriving earlier or later than ideal. Even if the transmitter and receiver clocks are perfectly synchronized, jitter might cause a transition to arrive at some time other than expected, in turn possibly causing the receiver to sample at the wrong time and yield a bit error.

A common tool for visualizing and quantifying the impact of jitter and other distortion on signals is the "eye diagram," examples of which can be found in FIG. 1. The signal of interest is captured on an oscilloscope set to relatively long persistence so that successive signals accumulate on the screen. Typically, a period of two UI is set, with one complete UI in the middle of the screen and one-half of a UI on either side. As the signals accumulate, an "eye" is defined on the screen. In FIG. 1, graph 104 is a relatively undistorted signal with a large, clearly defined eye, while graph 108 shows how jitter and other distortion cause the eye opening to shrink both vertically and horizontally. This shrinkage may result in a larger bit error rate (BER) and, consequently, poor or unacceptable performance.

There are two basic types of jitter: random and deterministic. Random jitter is the sum of countless minor distortions caused by thermal noise, external interference, etc. The amplitude of random jitter is treated as a random variable with Gaussian statistics. The Gaussian probability distribution function implies that the peak-to-peak amplitude of the random jitter is a function of observation interval, e.g., a larger peak-to-peak range will be observed over longer periods of time. Deterministic jitter, on the other hand, can be associated with a particular cause and hence is typically non-Gaussian and bounded (i.e., it has minimum and maximum values).

Serial interface standards specify the jitter output of transmitters, the jitter tolerance of receivers, and, either explicitly or by reference, the jitter contributed by a channel. These standards are derived from, and are sometimes accompanied by, a jitter budget, which is a means to ensure that the worst-case compliant transmitter and channel do not exceed the jitter tolerance of the worst-case compliant receiver.

Typically, these standards operate by defining one or more "reference" devices, i.e., software models of hypothetical devices, e.g., a reference receiver, a reference channel, or a reference transmitter. Compliance with the standard is defined as meeting one or more metrics when interoperating with the reference devices defined by the standard. For example, a transmitter standard might define a reference channel and a reference receiver. To determine whether a particular transmitter meets the transmitter standard, the transmitter's output is captured as a digital file, and then that file is processed through the transmitter standard's reference channel and reference receiver. If the resulting signal meets one or more metrics specified by the transmitter standard, then the transmitter is compliant.

As device-makers wring more performance from their products by increasing clock speeds and reducing voltage levels, it becomes increasingly difficult to "close" the jitter budget and hence comply with standards. In response, device-makers implement increasingly sophisticated tools to maintain compliance with these standards. For example, device-makers first used fixed frequency equalizers to compensate for certain types of jitter. However, the optimal frequency for such an equalizer is a function of the length of the channel connecting transmitter and receiver. As such, fixed equalizers have been replaced by adaptive equalizers which can automatically tune themselves to the optimal frequency, thus squeezing even more performance from the system.

Serial interface standards are updated regularly to reflect these realities. Specifically, reference device models are routinely updated so that they accurately mirror the performance of their physical counterparts. Without such updating, standards become over-demanding, requiring device makers to waste resources trying to accommodate reference models based on older, less-efficient devices. In a world where adaptive equalizers are the norm, a standard based on static equalizers forces compliant devices to be more expensive than they need to be to deliver a specified BER.

Similarly, standards are periodically revisited to ensure that they are not under-demanding due to simplifying assumptions. For example, some current serial interface standards include reference receivers that do not model the transient response of the TRU or its sensitivity to the transition density of the input signal. Failure to account for these factors leads to errors in performance estimation could result in compliant devices failing to interoperate in a worst-case environment.

IEEE Std 802.3aq-2006 (http://standards.ieee.org/get-ieee802/download/802.3aq-2006.pdf) is one standard in use today that addresses the issue of jitter in high-speed serial communications. This standard describes the Transmitter and Waveform Dispersion Penalty (TWDP), which is used as a measure of the quality of an optical transmitter.

FIG. 2 is a block diagram of the TWDP standard. Symbols a(k) are fed into transmitter 202. The output of transmitter 202 is captured and processed through a reference channel 204. Reference channel 204 is a software program that emulates the behavior of a physical channel, e.g., channel 106 of FIG. 1. The user of the standard selects a specific reference channel from a set of reference channels. These reference channels emulate different types of channels; e.g., one reference channel might emulate a certain type of copper cable, while another emulates a certain type of fiber optic cable.

Reference channel 204 outputs signal u(t). Adder 206 combines u(t) with white Gaussian noise n(t) which may emulate the noise present in an optical channel, crosstalk in an electrical channel, or other sources of noise related to the application of interest, and sends the resulting noisy signal v(t) to reference receiver 208. Reference receiver 208 is a software program that emulates the behavior of a physical receiver, e.g., receiver 110 of FIG. 1. Reference receiver 208 includes a reference adaptive equalizer of fixed complexity.

FIG. 3 is a block diagram of prior art TWDP/WDP reference receiver 208 of FIG. 2. Input signal v(t) is sent to anti-aliasing filter 302, which filters out all frequencies higher than half the data rate (e.g., for a data rate of 10 Gb/s, filter 302 will filter out all frequencies above 5 GHz). Filter 302 is typically a fourth-order Butterworth filter.

The analog output y(t) of anti-aliasing filter 302 is then sampled by continuous-to-discrete (C/D) module 304, the exact sampling points being determined by a stream s(t) of impulses as defined by the following Equation (1):

$$s(t) = \sum_k \delta\left(t_s + \frac{kT}{M}\right) \quad (1)$$

where $t_s$ is the timing offset, and T/M is the sampling rate, where T equals the UI duration and M is the oversampling factor, e.g., two. Timing offset $t_s$ is calculated by dividing the UI into a number of equal segments (e.g., 16) and selecting the value of $t_s$ that yields the minimum mean-squared error of error signal e(k).

The output y(k) of C/D module 304 is then sent to Minimum-Mean-Squared-Error Decision Feedback Equalizer (MMSE-DFE) 306. In particular, y(k) goes to discrete-time feed-forward filter 308, whose coefficients $c_i$ are set so as to minimize the error signal e(k). The output y'(k) of that filter is defined by the following Equation (2):

$$y'(k) = \sum_{i=0}^{N-1} c_i y(k-i) \quad (2)$$

Downsampler 310 downsamples the output from filter 308 at oversampling rate M. Combiner 312 subtracts the output â'(k) of feedback filter 314 from the output of downsampler 310 to yield $y_c(k)$. Signal $y_c(k)$ can be viewed as the sum of 1) noise-free samples $z_c(k)$ and 2) sampled, filtered noise $n_c(k)$ which is n(t) filtered by anti-aliasing filter 302 and discrete-time filter 308 in FIG. 3.

Signal $y_c(k)$ is sent to bit slicer 316, which renders signal â(k). Combiner 318 subtracts output signal â(k) from signal $y_t(k)$ to yield the error signal e(k). Lastly, â(k) is used as the input to feedback filter 314, which has coefficients $d_i$ also set so as to minimize error signal e(k). The output â'(k) of that filter is defined by the following Equation (3):

$$\hat{a}'(k) = \sum_{i=0}^{N-1} d_i \hat{a}(k-i) \quad (3)$$

Returning to FIG. 2, reference receiver 208 sends $y_c(k)$ to TWDP Calculation module 210. TWDP Calculation module 210 calculates the signal-to-noise ratio (SNR) of $y_c(k)$, and compares that SNR value to the SNR of an ideal receiver (i.e., matched filter) driven by an ideal transmitter via an ideal channel with additive white Gaussian noise n(t).

The difference between the two SNR values is a final metric 212 called the Transmitter and Waveform Dispersion Penalty (TWDP), where a larger penalty corresponds to a lower-quality transmitter output. A variation of this method, referred to as WDP, has also been proposed to evaluate a signal captured at the output of a channel, hence removing the channel portion of the software emulation.

Another standard in use is the XFP implementation agreement, INF-8077i (www.xfpmsa.org/XFP_SFF_INF_8077i_Rev4_0.pdf.), which defines the concept of "equalizable jitter" (EQJ) and describes a test to quantify such jitter using a fixed analog equalizer (consisting of a single zero and a single pole) and a reference timing recovery unit.

Yet another standard is the OIF-CEI implementation agreement (www.oiforum.com/public/documents/CEI_P-01.0.pdf), which uses a reference transmitter and receiver, but not a reference timing recovery unit, to test the compliance of channels. OIF-CEI acknowledges that a portion of the deterministic jitter allocation in the jitter budget is "equalizable" and uses this fact to close its informative jitter budget. However, no test is defined to measure this quantity.

SUMMARY OF THE INVENTION

A shortcoming of the TWDP/WDP standard is that it examines the signal amplitude at a static clock phase (i.e., fixed timing offset $t_s$), which is chosen after an exhaustive search of all candidate phases. This method does not include the transient behavior of a TRU and hence does not include the response to phase steps or similar phenomena in its assessment.

Furthermore, TWDP/WDP selects the time associated with the minimum mean-squared error at the sampling moment, because the discrete-time feed-forward and feedback filters of TWDP/WDP can inspect only the vertical dimension of the eye opening, and not the horizontal. However, the time of maximum vertical eye opening might not be the ideal sampling moment, as in those cases where the eye is not horizontally symmetric, and the time of minimum mean-squared error is closer to one transition than another. As such, TWDP/WDP under-specifies such situations, raising the possibility of nominally compliant devices failing in the field.

Lastly, no attempt is made in TWDP/WDP to measure the residual, post-equalization jitter.

While XFP includes a reference TRU, which TWDP/WDP does not, the standard lacks TWDP/WDP's reference adaptive equalizer, replacing it with a fixed equalizer, i.e., a high-pass filter with a single zero and a single pole. This fixed analog equalizer is only suitable for a subset of the channels to be addressed by contemporary serial interface standards and may enhance jitter on channels for which it is not suited. This yields conservative results and unnecessarily reduces the degrees of freedom available to aid in closing the jitter budget. An adaptive equalizer more appropriately models the capability of contemporary receivers.

Like TWDP/WDP, OIF-CEI has a reference adaptive equalizer, but no reference TRU, and as such shares TWDP/WDP's shortcomings.

One embodiment of the present invention builds upon the basic methodology of TWDP in that a signal of interest is captured and passed to an optional reference channel and a reference receiver that incorporates an adaptive equalizer. However, the embodiment of the present invention also includes a reference TRU in its reference receiver to properly account for the response to phase steps and similar phenomena. The reference TRU scans the sampling clock phase to evaluate the post-equalizer jitter (e.g., the non-compensable jitter). The embodiment of the present invention then outputs two metrics. The first metric is calculated in the same manner as TWDP in the prior art method, but utilizes the data from the improved reference receiver, and thus is referred to as Enhanced TWDP. The second metric, NC-DDJ, is an entirely new metric which measures the amount of non-compensable jitter in fractions of UI.

As such, one embodiment of the present invention provides a complete assessment of the residual jitter in a signal following processing by a reference TRU and an adaptive equalizer. The difference between the input jitter and this residual jitter may be included in the jitter budget to aid in closing the budget. An embodiment of the present invention may be applied to the evaluation of a transmitter's output, the calibration of a signal to be used in stress testing a receiver, or a tool to aid in the composition of a jitter budget.

In one embodiment, the invention is an apparatus for characterizing jitter in a first time-domain signal. A time-domain feed-forward filter filters a first copy of the first time-domain signal to generate a filtered, second time-domain signal. A time-domain timing recovery unit derives a timing signal from a second copy of the first time-domain signal. A variable delay module delays the timing signal by a specified delay duration to generate a delayed timing signal. A continuous-to-discrete module samples a third time-domain signal based on the delayed timing signal to generate a first discrete-time signal. A slicer slices the first discrete-time signal to generate an output bitstream. A discrete-to-continuous converter converts the output bitstream into a fourth time-domain signal. A time-domain feed-back filter filters the fourth time-domain signal to generate a filtered, fifth time-domain signal. A combiner generates the third time-domain signal based on a difference between the second time-domain signal and the fifth time-domain signal. A post-processor characterizes an amount of jitter in the first time-domain signal based on the specified delay duration.

BRIEF DESCRIPTION OF THE DRAWINGS

Other aspects, features, and advantages of the invention will become more fully apparent from the following detailed description, the appended claims, and the accompanying drawings in which like reference numerals identify similar or identical elements.

FIG. 9 is a side-by-side comparison of (1) the performance of a receiver conforming to the prior art TWDP/WDP standard (FIG. 9(a)) and (2) the performance of reference receiver 408 of FIG. 5 (FIG. 9(b)), both in response to the CJTPAT testing signal.

DETAILED DESCRIPTION

Figure 4:
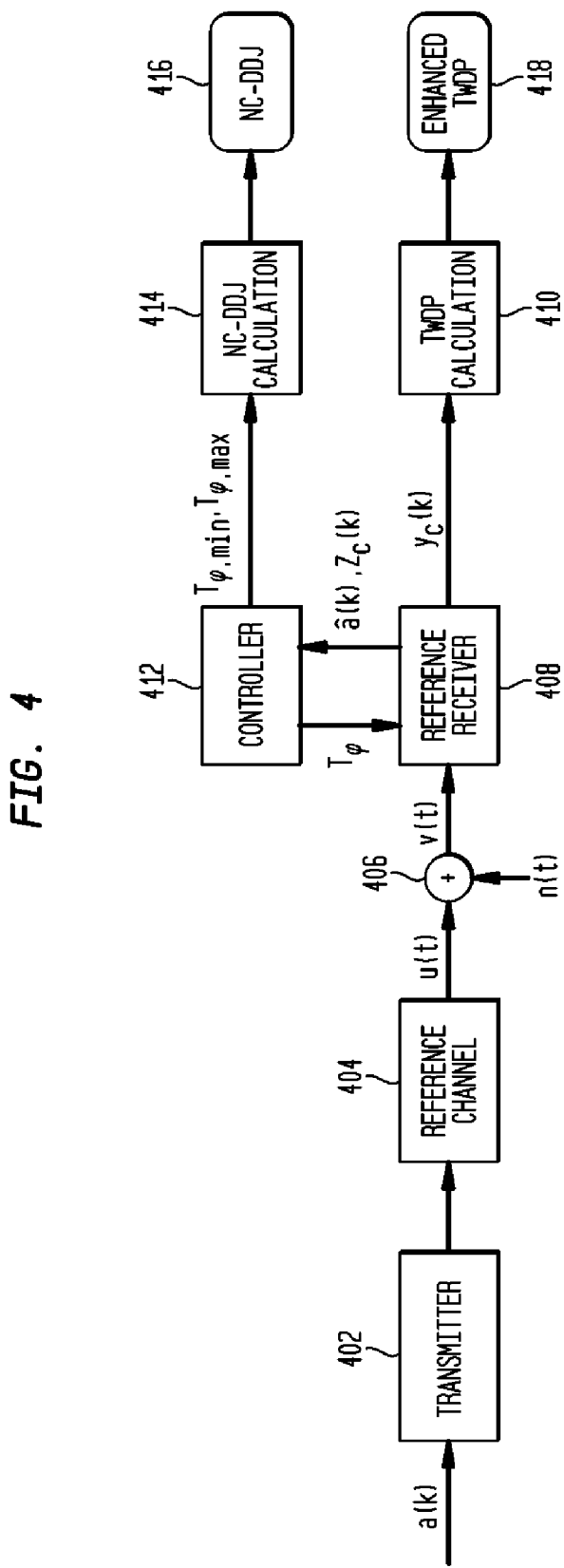
FIG. 4 is a block diagram of one embodiment of the present invention.

FIG. 4 is a block diagram of one embodiment of the present invention. Elements 402, 404, 406, and 410 are analogous to elements 202, 204, 206, and 210 of FIG. 2. Likewise, signals a(k), u(t), and v(t) are the same as the similarly named signals in FIG. 2.

Figure 1:
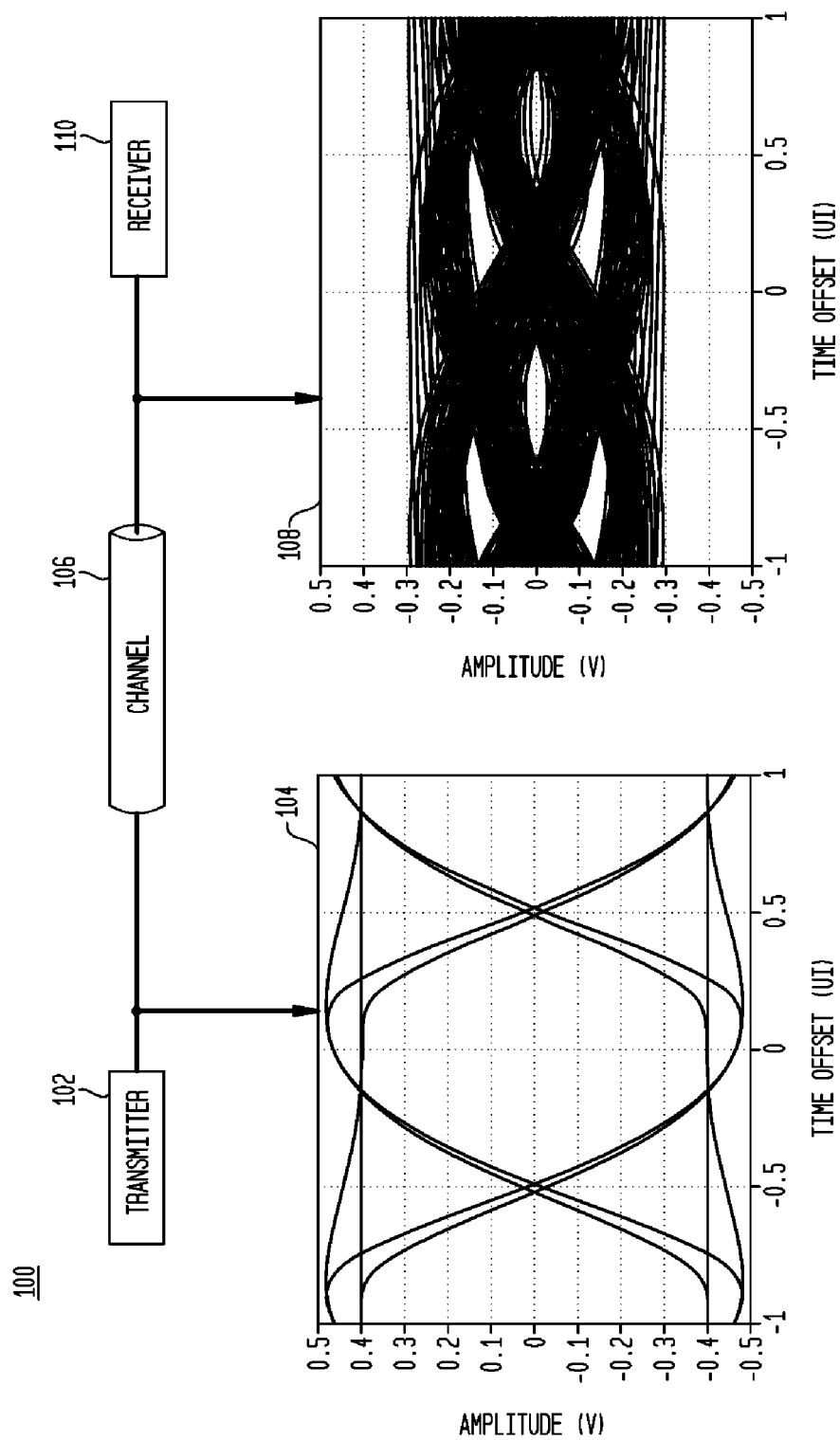
FIG. 1 is a high-level block diagram of a serial communications system 100 comprising a transmitter 102, a receiver 110, and a channel 106, which carries signals from transmitter 102 to receiver 110.
Figure 2:
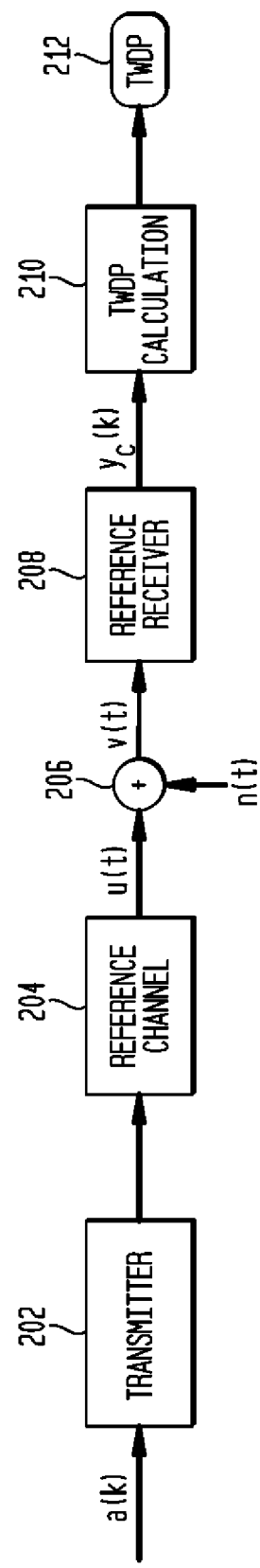
FIG. 2 is a block diagram of the TWDP standard.
Figure 3:
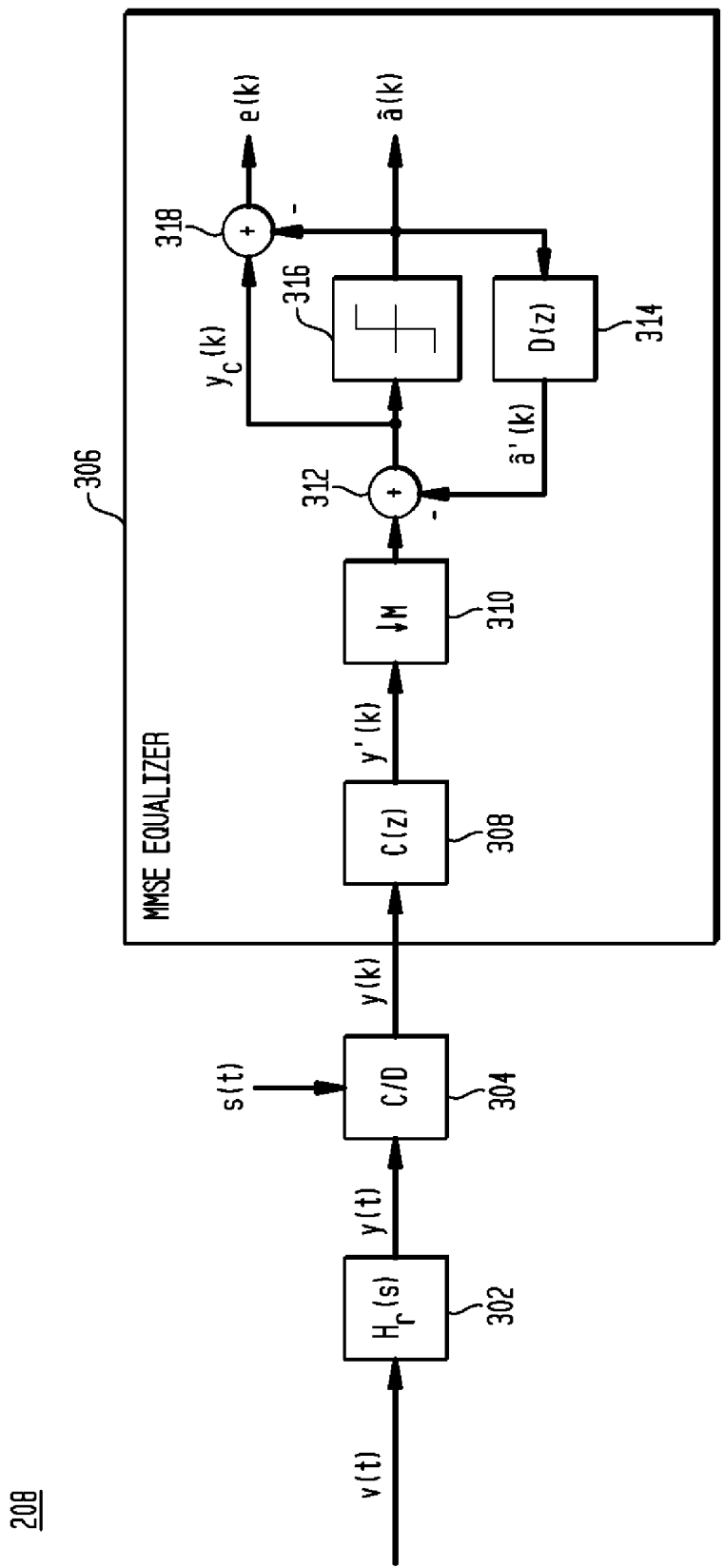
FIG. 3 is a block diagram of prior art TWDP/WDP reference receiver 208 of FIG. 2.
Figure 5:
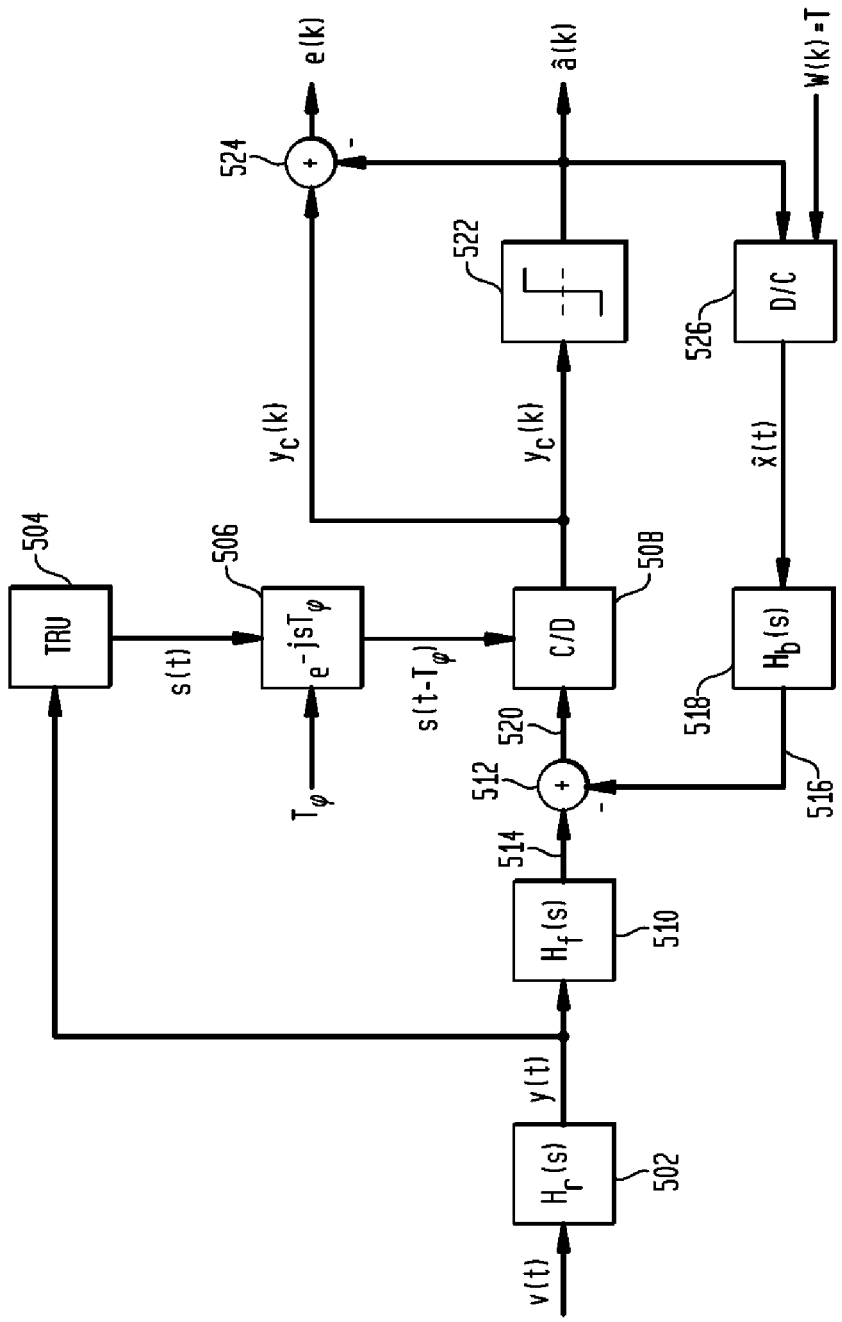
FIG. 5 is a block diagram of reference receiver 408 of FIG. 4.

Reference receiver 408 differs from prior art reference receiver 208 of FIG. 2. FIG. 5 is a block diagram of reference receiver 408 of FIG. 4. Anti-aliasing filter 502 and its respective input and output signals are analogous to anti-aliasing filter 302 of FIG. 3 and its respective input and output signals.

The analog output y(t) from anti-aliasing filter 502 is split, with one branch going to Timing Recovery Unit (TRU) 504, which yields a stream s(t) of impulses. Variable delay module 506 delays those impulses by a specified delay duration $T_\phi$. Variable delay module 506 also outputs a delayed impulse stream $s(t-T_\phi)$ which determines the sampling points for Continuous-to-Discrete (C/D) module 508. Meanwhile, y(t) is also sent to continuous-time feed-forward filter 510, which is represented by Equation (4) as follows:

$$H_f(s) = \sum_{n=0}^{N_f-1} c_n e^{-s(nT/M)} \qquad (4)$$

where $N_f$ is the number of filter coefficients, $c_n$ is the $n^{th}$ coefficient, and $e^{-s(nT/M)}$ is the delay associated with that $n^{th}$ coefficient.

Combining node 512 reduces filter 510's output 514 by a feedback-loop signal 516 from continuous-time feedback filter 518 and passes the result 520 to C/D module 508, which outputs a digital stream of samples $y_c(k)$. Bit slicer 522 takes this stream of samples and outputs bitstream â(k). Combining node 523 subtracts â(k) from $y_c(k)$ to yield error signal e (k). Bitstream â(k) is also fed to Digital-to-Continuous Converter (D/C) 526, which converts bitstream â(k) into continuous, rectangular waveform x̂(t) using the following Equation (5):

$$\hat{x}(t) = \sum_k \hat{a}(k)\Pi\left(\frac{t-kT}{T}\right) \quad (5)$$

where $$\Pi\left(\frac{t-kT}{T}\right)$$

is a pulse of unit amplitude and duration T from time t=kT to time t=(k+1)T.

Continuous output x̂(t) of D/C converter 526 is then filtered by continuous-time feedback filter 518, which is represented by the following Equation (6):

$$H_b(s) = e^{-sT_{fb}} \sum_{n=1}^{N_b-1} d_n e^{-s(nT)} \quad (6)$$

where $$e^{-sT_{fb}}$$

is a propagation delay factor, $N_b$ is the number of filter coefficients, $d_n$ is the $n^{th}$ coefficient, and $e^{-s(nT)}$ is the delay associated with each coefficient.

Returning to FIG. 4, Controller module 412 receives from Reference Receiver 408 two values: output bitstream â(k) and noise-free samples $z_c(k)$. Module 412 sends a range of delay durations $T_\phi$ to Reference Receiver 408, and sends two delay durations, $T_{\phi,min}$ and $T_{\phi,max}$ to NC-DDJ Calculation module 414.

Module 412 implements a horizontal eye scan that calculates $T_{\phi,min}$ and $T_{\phi,max}$. First, module 412 defines distance-to-threshold d(k). If, for example, a logic "0" is represented by 0 volts, and a logic "1" is represented by 1 volt, then the threshold used to determine if a noise-free sample $z_c(k)$ is a "0" or "1" is 0.5 volts. Thus, in this example, distance-to-threshold d(k) is represented by the following Equations (7) and (8):

$$d(k)=0.5-z_c(k) \text{ (when â(k)="0")} \quad (7)$$

$$d(k)=z_c(k)-0.5 \text{ (when â(k)="1")} \quad (8)$$

Note that detection errors would then correspond to d(k)≦0. Also note that for the purpose of both the prior art reference receiver, and the present invention, the MMSE-DFE is assumed to always make correct decisions, hence â(k)=a(k). In other words, the bitstream outputted by reference receiver 408 is identical to the symbols received by transmitter 402.

For a given phase offset $T_\phi$, Module 412 takes the minimum value of d(k) over all k to yield contour $d_{min}(T_{100})$. If there is a measurable eye opening, then contour $d_{min}(T_\phi)$ crosses zero at two locations, the left eye transition and the right eye transition.

If $d_{min}(T_\phi)$ over all $T_\phi$ is less than or equal to zero, then $T_{100,min}=T_{\phi,max}=0$, i.e., the eye is closed. Otherwise, $T_{\phi,min}$ is the minimum value of the zero crossings of $d_{min}(T_\phi)$ or −0.5 UI, whichever is the more positive value. $T_{\phi,max}$ is the maximum value of the zero crossings of $d_{min}(T_\phi)$ or 0.5 UI, whichever is the less positive value.

$T_{\phi,min}$ and $T_{\phi,max}$ are then sent to NC-DDJ calculation module 414. Module 414 calculates metric NC-DDJ 416 by one of several methods. One method is to take twice the minimum magnitude of $T_{100,min}$ and $T_{\phi,max}$, and subtract the result from the UI. For example, if $T_{\phi,min}$ is −0.35 of the UI and $T_{\phi,max}$ is +0.45 of the UI, then NC-DDJ is 1−(2×0.35)=0.3, which means that after accounting for equalization and TRU response, there is still a discrepancy between the UI and the observed eye opening of 0.3 UI. This discrepancy is Non-Compensable Data-Dependent Jitter, or NC-DDJ. Another method for the calculation of NC-DDJ is to take the absolute distance between $T_{\phi,min}$ and $T_{\phi,max}$ and subtract that figure from 1.

TWDP Calculation module 410 in FIG. 4 is identical to TWDP Calculation module 210 in FIG. 2. However, the $y_c(k)$ value that module 410 receives from Reference Receiver 408 differs significantly from the $y_c(k)$ value generated by Reference Receiver 208 in FIG. 2, given the same v(t). As such, metric TWDP 212 in FIG. 2 has been renamed Enhanced TWDP 418 in FIG. 4. Note that for the purpose of Enhanced TWDP calculation, $T_\phi$ is set to 0.

Figure 6:
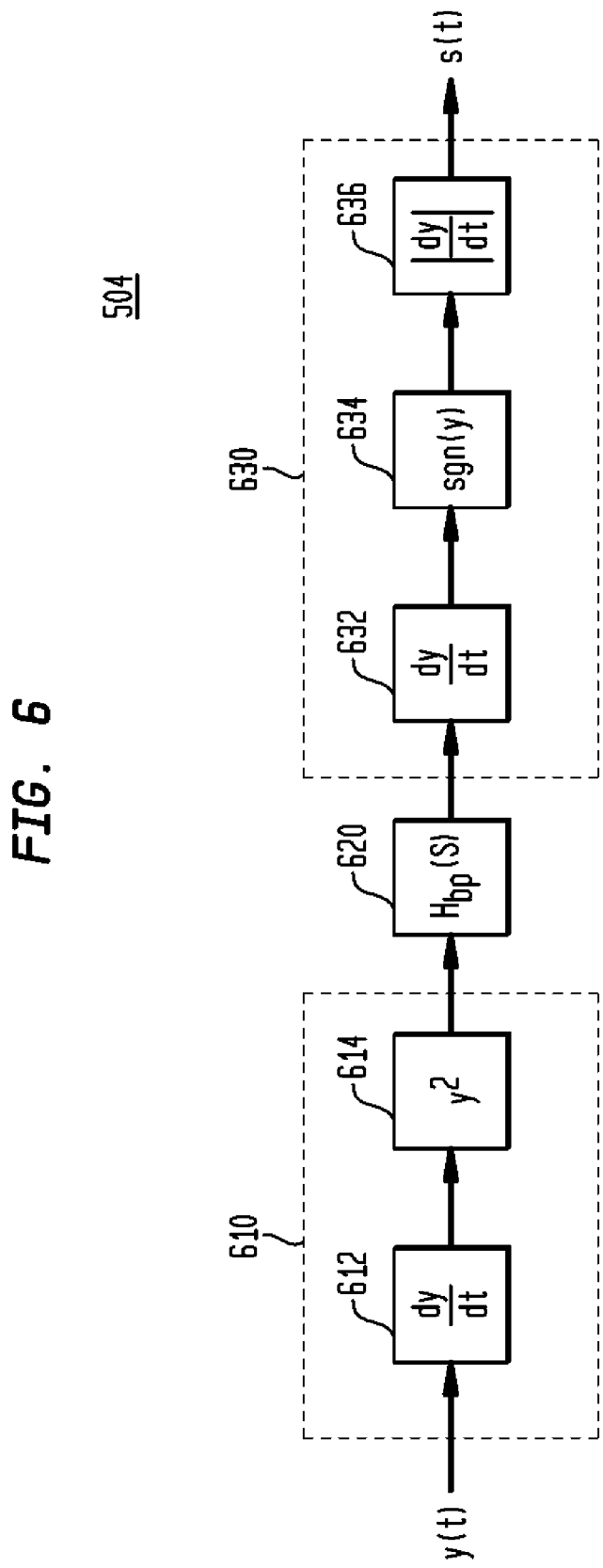
FIG. 6 is a block diagram of Timing Recovery Unit (TRU) 504 of FIG. 5.

FIG. 6 is a block diagram of Timing Recovery Unit (TRU) 504 of FIG. 5. TRU 504 uses a non-linear spectral line method to recover the timing signal. In first section 610, a nonlinearity is applied to the input signal y(t). There exists a broad class of non-linear functions that could be used in section 610. In FIG. 6, the particular function chosen is to take a derivative 612 of the signal is taken and then square 614 that derivative. The resulting signal is fed to filter 620, typically a second-order bandpass filter with a corner frequency set to 1/1667 of the signaling speed. The output of filter 620 is a tone having the frequency of the signaling speed. That tone is fed into a second section 630, which converts the tone into a stream of impulses. More specifically, the derivative 632 of the tone waveform is taken and then the sign 634 of that derivative is sent to a magnitude 636 of derivative function, which returns a stream of impulses at the clock rate.

FIG. 7 graphically illustrates the performance of TRU 504 of FIG. 5 in response to the Jitter Tolerance Scrambled Test Pattern (JTSPAT) and the Compliant Jitter Tolerance Test Pattern (CJTPAT). The JTSPAT signal (FIG. 7(a)) is a random mix of high- and low-frequency signals, and thus the Timing Recovery Error graph (FIG. 7(b)) shows the TRU making numerous adjustments to the Unit Interval to compensate for the constantly varying amounts of jitter.

Figure 7A:
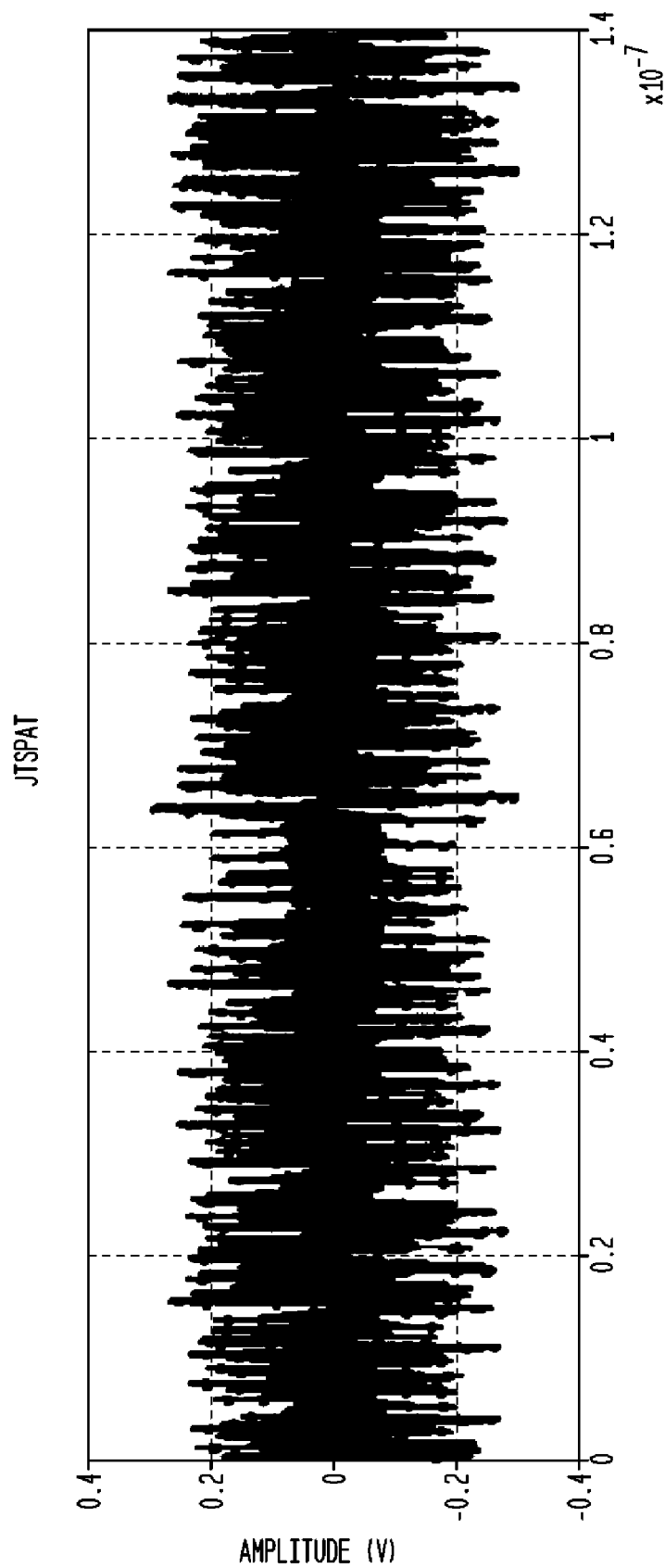
FIG. 7 graphically illustrates the performance of TRU 504 of FIG. 5 in response to the Jitter Tolerance Scrambled Test Pattern (JTSPAT) and the Compliant Jitter Tolerance Test Pattern (CJTPAT).
Figure 7B:
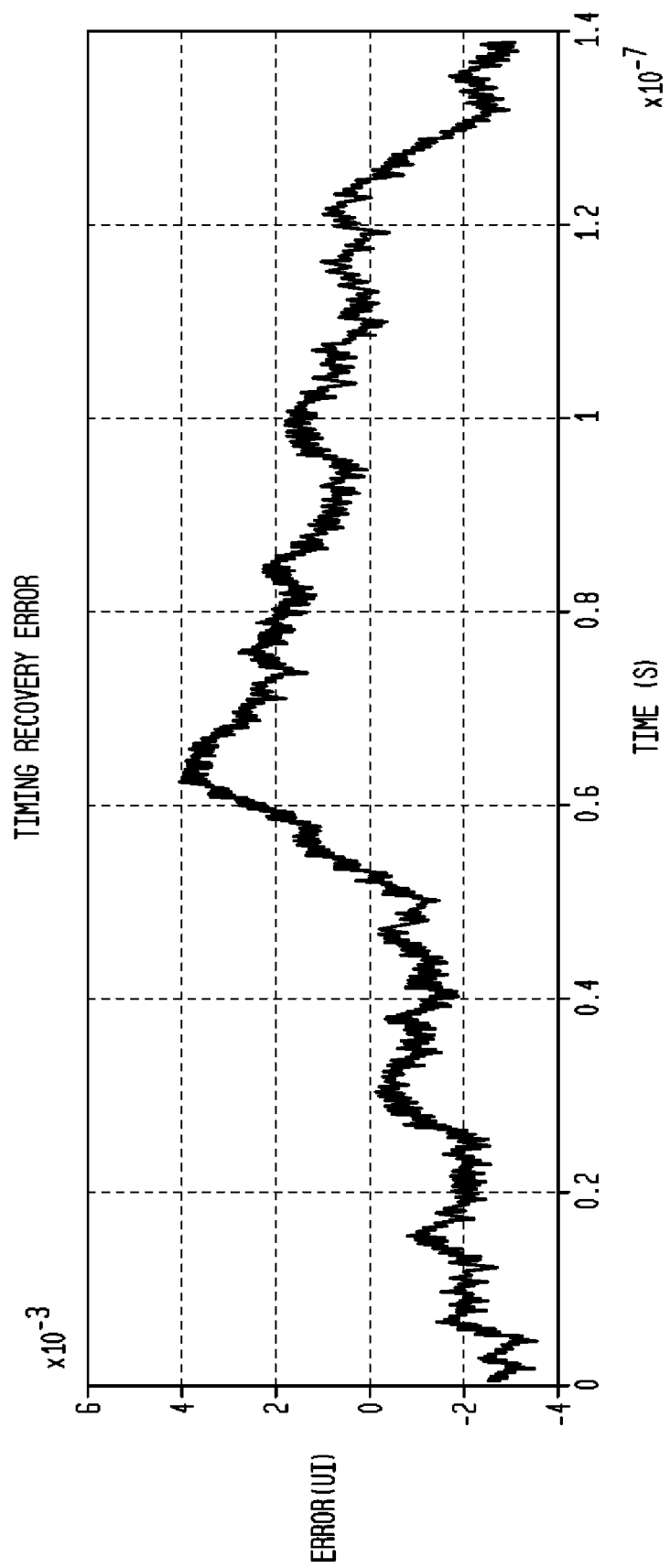
Figure 7C:
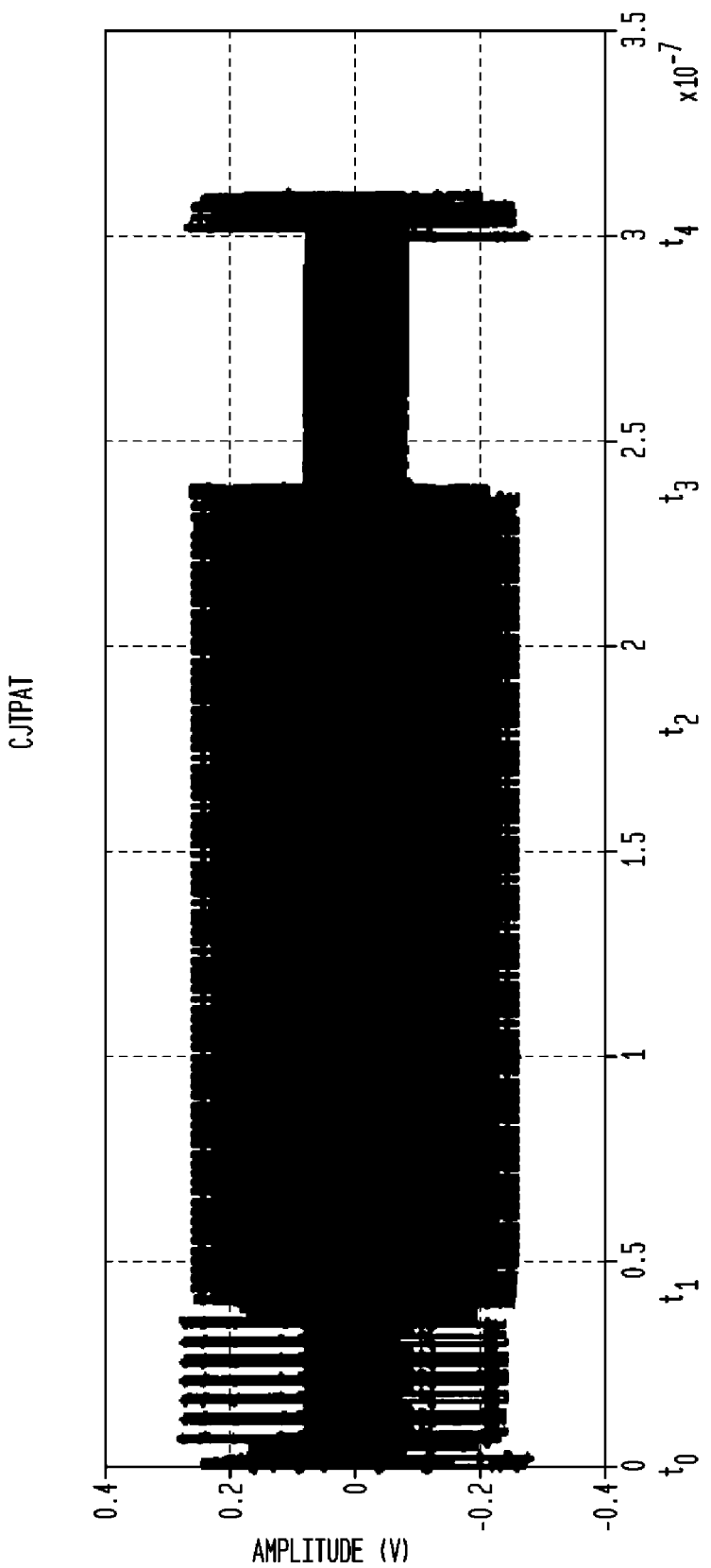
Figure 7D:
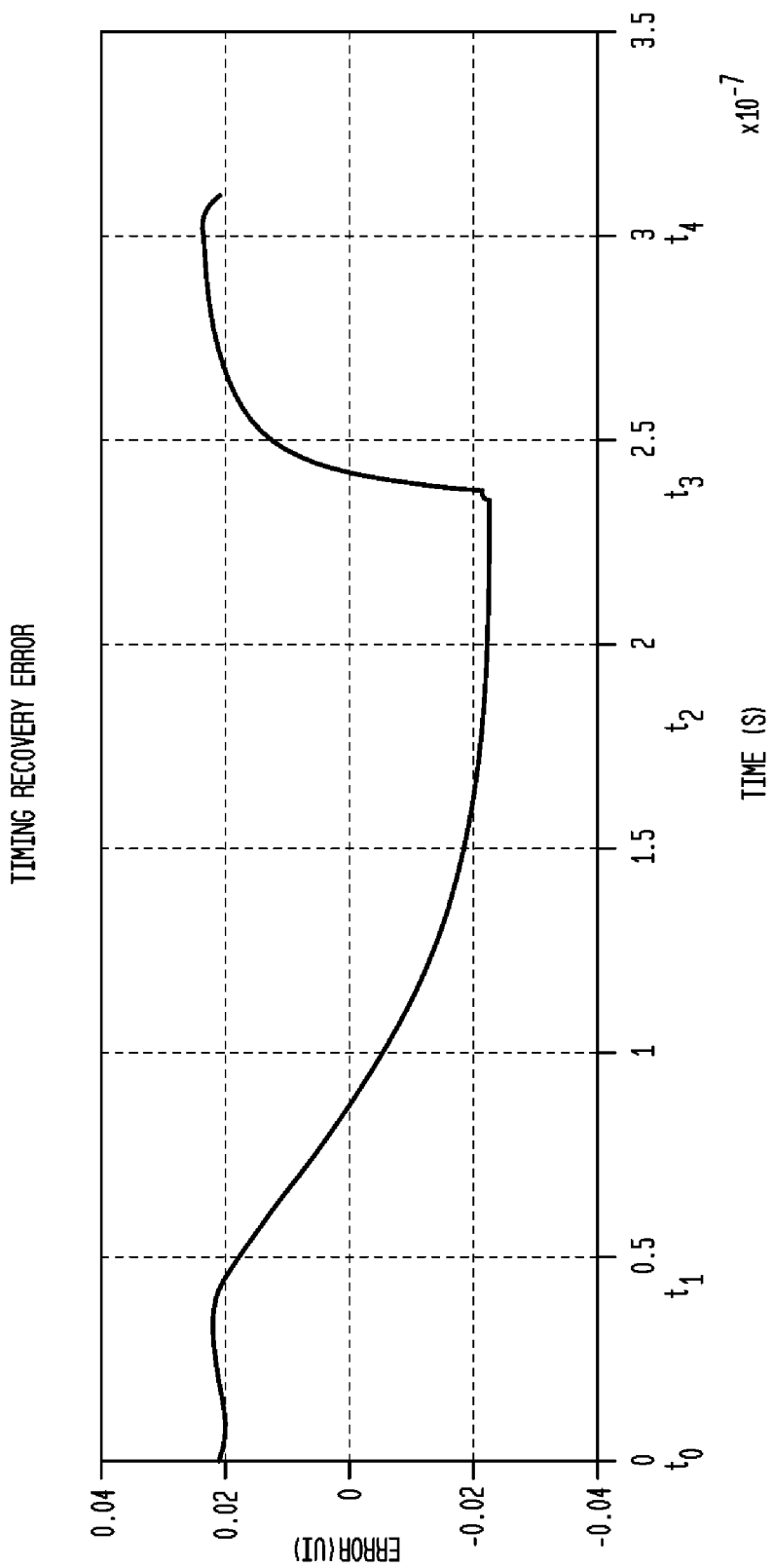

The CJTPAT signal (FIG. 7(c)) consists of a repeating, mixed-frequency preamble from time $t_0$ to $t_1$, a continuous low-frequency signal from time $t_1$ to time $t_3$, and a continuous high-frequency signal from time $t_3$ to time $t_4$. The accompanying Timing Recovery Error graph (FIG. 7(d)) demonstrates more clearly how the reference TRU compensates for jitter. Low-frequency signals have less propagation delay than high-frequency signals, and thus travel the distance from transmitter to receiver in less time. This is reflected in FIG. 7(c) by the gradual decline in UI error from about +0.02 at time $t_1$ to about −0.02 at time $t_2$ as the TRU compensates for the change from a mixed-frequency preamble to a continuous low-frequency signal. Likewise, when the CJTPAT waveform transitions from low-frequency to high-frequency at time $t_3$, FIG. 7(d) shows the TRU compensating for the greater group propagation delay by re-adjusting the UI from about −0.02 back up to about +0.02.

This adaptive behavior of the TRU demonstrated in FIGS. 7(b) and D(d) should be contrasted with TWDP/WDP. In that standard, the UI interval is a static time determined by a brute-force search for the maximum vertical eye opening. Thus, a plot of the TWDP/WDP standard analogous to the plots in FIGS. 7(b) and 7(d) would show a flat line at 0 UI error.

Figure 8A:
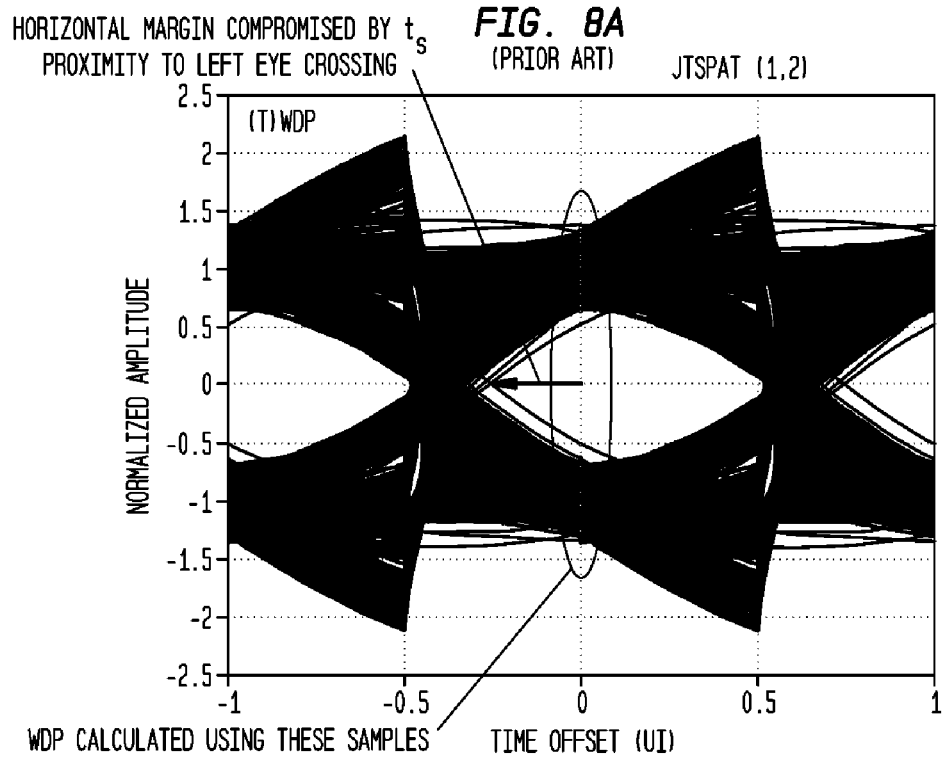
FIG. 8 is a side-by-side comparison of (1) a JTSPAT test signal as processed by a reference receiver conforming to the prior art TWDP/WDP standard (FIG. 8(a)) and (2) a JTSPAT test signal as processed by reference receiver 408 of FIG. 5 (FIG. 8(b)).
Figure 8B:
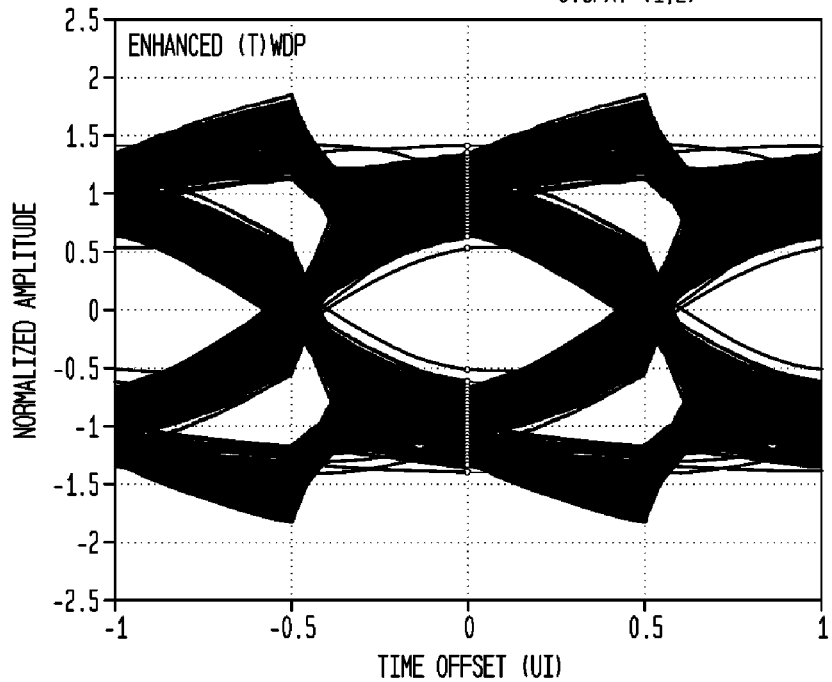

FIG. 8 is a side-by-side comparison of (1) the performance of a receiver conforming to the prior art TWDP/WDP standard (FIG. 8(a)) and (2) the performance of reference receiver 408 of FIG. 5 (FIG. 8(b)), both in response to the JTSPAT testing signal. Note that, as shown in FIG. 8(b), reference receiver 408 of FIG. 5 correctly centers the eye, providing the maximum timing margin both before and after the sampling time, whereas, as shown in FIG. 8(a), the prior art receiver places the sampling point closer to the left edge of the eye, compromising the horizontal margin.

FIG. 9 is a side-by-side comparison of (1) the performance of a receiver conforming to the prior art TWDP/WDP standard (FIG. 9(a)) and (2) the performance of reference receiver 408 of FIG. 5 (FIG. 9(b)), both in response to the CJTPAT testing signal. Note that, as shown in FIG. 9(b), reference receiver 408 of FIG. 5 correctly centers the eye, providing the maximum timing margin both before and after the sampling time, whereas, as shown in FIG. 9(a), the prior art receiver places the sampling point closer to the left edge of the eye, compromising the horizontal margin.

In one embodiment of the present invention, the output of a transmitter (e.g., transmitter 404 of FIG. 4) is captured as a digital file and processed through a reference channel (e.g., channel 404 of FIG. 4). Then, the output u(t) of that reference channel becomes the input of the reference receiver (e.g., receiver 408 of FIG. 5). In another embodiment, the captured signal is receiver input, i.e., post-channel signal. In that case, the reference channel is omitted or replaced with an allpass filter.

The present invention may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

We claim:

1. A method for characterizing jitter in a first continuous-time signal, the method comprising:
   (a) applying a first copy of the first continuous-time signal to a continuous-time feed-forward filter to generate a filtered, second continuous-time signal;
   (b) applying a second copy of the first continuous-time signal to a continuous-time timing recovery unit to derive a timing signal;
   (c) delaying the timing signal by a specified delay duration to generate a delayed timing signal;
   (d) sampling a third continuous-time signal based on the delayed timing signal to generate a first discrete-time signal;
   (e) slicing the first discrete-time signal to generate an output bitstream;
   (f) converting the output bitstream into a fourth continuous-time signal;
   (g) applying the fourth continuous-time signal to a continuous-time feed-back filter to generate a filtered, fifth continuous-time signal;
   (h) generating the third continuous-time signal based on a difference between the second continuous-time signal and the fifth continuous-time signal; and
   (i) characterizing an amount of jitter in the first continuous-time signal based on the specified delay duration.

2. The invention of claim 1, wherein the characterized amount of jitter is a characterized amount of non-compensable jitter in the first continuous-time signal.

3. The invention of claim 1, wherein step (a) further comprises:
   (a1) providing a continuous-time received signal;
   (a2) adding a continuous-time noise signal to the continuous-time received signal to generate a continuous-time noisy signal; and
   (a3) applying the continuous-time noisy signal to an anti-aliasing filter to generate the first continuous-time signal.

4. The invention of claim 3, wherein step (a1) further comprises applying a transmitted signal to a reference channel emulating a transmission channel to generate the continuous-time received signal.

5. The invention of claim 1, wherein step (i) comprises characterizing the amount of jitter in the first continuous-time signal based on a minimum specified delay duration and a maximum specified delay duration.

6. The invention of claim 5, wherein steps (a)-(h) are implemented using a plurality of different values for the specified delay duration in order to identify the minimum and maximum delay durations.

7. The invention of claim 6, wherein the minimum and maximum delay durations correspond to edges of an eye diagram based on the first continuous-time signal.

8. The invention of claim 1, wherein:
   the first continuous-time signal is based on a transmitted signal generated by a transmitter; and
   further comprising the step of using the characterized amount of jitter in the first continuous-time signal to evaluate jitter performance of the transmitter.

9. The invention of claim 1, further comprising the step of using the characterized amount of jitter in the first continuous-time signal to calibrate a signal used in stress testing a receiver.

10. The invention of claim 1, further comprising the step of using the characterized amount of jitter in the first continuous-time signal to generate a jitter budget for a communications system.

11. The invention of claim 1, wherein:
    the characterized amount of jitter is a characterized amount of non-compensable jitter in the first continuous-time signal;
    step (a) further comprises:
      (a1) applying a transmitted signal to a reference channel emulating a transmission channel to generate a continuous-time received signal;
      (a2) adding a continuous-time noise signal to the continuous-time received signal to generate a continuous-time noisy signal; and
      (a3) applying the continuous-time noisy signal to an anti-aliasing filter to generate the first continuous-time signal;
    step (i) comprises characterizing the amount of jitter in the first continuous-time signal based on a minimum specified delay duration and a maximum specified delay duration;
    steps (a)-(h) are implemented using a plurality of different values for the specified delay duration in order to identify the minimum and maximum delay durations, wherein the minimum and maximum delay durations correspond to edges of an eye diagram based on the first continuous-time signal.

12. The invention of claim 11, wherein:
    the first continuous-time signal is based on a transmitted signal generated by a transmitter; and
    further comprising the step of using the characterized amount of jitter in the first continuous-time signal to evaluate jitter performance of the transmitter.

13. The invention of claim 11, further comprising the step of using the characterized amount of jitter in the first continuous-time signal to calibrate a signal used in stress testing a receiver.

14. The invention of claim 11, further comprising the step of using the characterized amount of jitter in the first continuous-time signal to generate a jitter budget for a communications system.

15. Apparatus for characterizing jitter in a first continuous-time signal, the apparatus comprising:
    a continuous-time feed-forward filter adapted to filter a first copy of the first continuous-time signal to generate a filtered, second continuous-time signal;
    a continuous-time timing recovery unit adapted to derive a timing signal from a second copy of the first continuous-time signal;
    a variable delay module adapted to delay the timing signal by a specified delay duration to generate a delayed timing signal;
    a continuous-to-discrete module adapted to sample a third continuous-time signal based on the delayed timing signal to generate a first discrete-time signal;
    a slicer adapted to slice the first discrete-time signal to generate an output bitstream;
    a discrete-to-continuous converter adapted to convert the output bitstream into a fourth continuous-time signal;
    a continuous-time feed-back filter adapted to filter the fourth continuous-time signal to generate a filtered, fifth continuous-time signal;
    a combiner adapted to generating the third continuous-time signal based on a difference between the second continuous-time signal and the fifth continuous-time signal; and
    a post-processor adapted to characterize an amount of jitter in the first continuous-time signal based on the specified delay duration.

16. The invention of claim 15, wherein the post-processor is adapted to characterize the amount of jitter in the first continuous-time signal based on a minimum specified delay duration and a maximum specified delay duration.

17. The invention of 16, wherein a plurality of different values are assigned to the specified delay duration in order to identify the minimum and maximum delay durations.

18. The invention of claim 17, wherein the minimum and maximum delay durations correspond to edges of an eye diagram based on the first continuous-time signal.

19. The invention of claim 15, wherein:
the first continuous-time signal is based on a transmitted signal generated by a transmitter; and
the characterized amount of jitter in the first continuous-time signal is used to evaluate jitter performance of the transmitter.

20. A machine-readable medium, having encoded thereon program code, wherein, when the program code is executed by a machine, the machine implements a method for characterizing jitter in a first continuous-time signal, the method comprising:
(a) applying a first copy of the first continuous-time signal to a continuous-time feed-forward filter to generate a filtered, second continuous-time signal;
(b) applying a second copy of the first continuous-time signal to a continuous-time timing recovery unit to derive a timing signal;
(c) delaying the timing signal by a specified delay duration to generate a delayed timing signal;
(d) sampling a third continuous-time signal based on the delayed timing signal to generate a first discrete-time signal;
(e) slicing the first discrete-time signal to generate an output bitstream;
(f) converting the output bitstream into a fourth continuous-time signal;
(g) applying the fourth continuous-time signal to a continuous-time feed-back filter to generate a filtered, fifth continuous-time signal;
(h) generating the third continuous-time signal based on a difference between the second continuous-time signal and the fifth continuous-time signal; and
(i) characterizing an amount of jitter in the first continuous-time signal based on the specified delay duration.

21. The invention of claim 20, wherein:
the characterized amount of jitter is a characterized amount of non-compensable jitter in the first continuous-time signal;
step (a) further comprises:
(a1) applying a transmitted signal to a reference channel emulating a transmission channel to generate a continuous-time received signal;
(a2) adding a continuous-time noise signal to the continuous-time received signal to generate a continuous-time noisy signal; and
(a3) applying the continuous-time noisy signal to an anti-aliasing filter to generate the first continuous-time signal;
step (i) comprises characterizing the amount of jitter in the first continuous-time signal based on a minimum specified delay duration and a maximum specified delay duration;
steps (a)-(h) are implemented using a plurality of different values for the specified delay duration in order to identify the minimum and maximum delay durations, wherein the minimum and maximum delay durations correspond to edges of an eye diagram based on the first continuous-time signal.

22. The invention of claim 15, wherein:
the characterized amount of jitter is a characterized amount of non-compensable jitter in the first continuous-time signal;
the continuous-time feed-forward filter is adapted to:
(a1) apply a transmitted signal to a reference channel emulating a transmission channel to generate a continuous-time received signal;
(a2) add a continuous-time noise signal to the continuous-time received signal to generate a continuous-time noisy signal; and
(a3) apply the continuous-time noisy signal to an anti-aliasing filter to generate the first continuous-time signal;
step (i) comprises characterizing the amount of jitter in the first continuous-time signal based on a minimum specified delay duration and a maximum specified delay duration;
steps (a)-(h) are implemented using a plurality of different values for the specified delay duration in order to identify the minimum and maximum delay durations, wherein the minimum and maximum delay durations correspond to edges of an eye diagram based on the first continuous-time signal.

\* \* \* \* \*